US008446966B2

(12) United States Patent
Suzuki

(10) Patent No.: US 8,446,966 B2
(45) Date of Patent: May 21, 2013

(54) BLOCK NOISE REDUCING APPARATUS

(75) Inventor: Yasuo Suzuki, Kawasaki (JP)

(73) Assignee: Victor Company of Japan, Ltd., Yokohama (JP)

( * ) Notice: Subject to any disclaimer, the term of this patent is extended or adjusted under 35 U.S.C. 154(b) by 193 days.

(21) Appl. No.: 13/064,586

(22) Filed: Apr. 1, 2011

(65) Prior Publication Data

US 2011/0182368 A1    Jul. 28, 2011

Related U.S. Application Data

(62) Division of application No. 12/585,585, filed on Sep. 18, 2009, now abandoned, which is a division of application No. 10/980,195, filed on Nov. 4, 2004, now abandoned.

(30) Foreign Application Priority Data

Jan. 20, 2004  (JP) .................................. 2004-012277

(51) Int. Cl.
*H04N 7/12*    (2006.01)
(52) U.S. Cl.
USPC .................................................. 375/240.29
(58) Field of Classification Search
USPC .................................................. 375/240.29
See application file for complete search history.

(56) References Cited

U.S. PATENT DOCUMENTS

| 5,937,101 A * | 8/1999 | Jeon et al. ..................... 382/268 |
| 6,539,060 B1 * | 3/2003 | Lee et al. ................. 375/240.29 |
| 2003/0138160 A1 | 7/2003 | Ishikawa |

FOREIGN PATENT DOCUMENTS

| JP | 01-256277 | 10/1989 |
| JP | 2001-119695 | 4/2001 |
| JP | 2002-344968 | 11/2002 |
| JP | 2004-007398 | 1/2004 |

* cited by examiner

*Primary Examiner* — Richard Torrente
(74) *Attorney, Agent, or Firm* — Louis Woo

(57) ABSTRACT

A calculation is made as to first and second differences in level represented by an input video signal at first and second inter-block boundaries adjoining opposite edges of every rectangular block respectively. A corrective value at every pixel in the rectangular block is calculated from a position of the pixel and the first and second differences according to a predetermined equation. The corrective value is added to a level represented by the input video signal to get an output video signal. The predetermined equation is designed so that levels represented by the output video signal at respective pixels in the rectangular block will be on a line given by a predetermined function of pixel position and connecting a first point in a range corresponding to the first difference and a second point in a range corresponding to the second difference.

2 Claims, 5 Drawing Sheets

BLOCK NOISE REDUCING APPARATUS

CROSS REFERENCES TO RELATED APPLICATIONS

This application is a division of U.S. application Ser. No. 12/585,585, filed on Sep. 18, 2009, since abandoned, was in turn a division of U.S. application Ser. No. 10/980,195, filed Nov. 4, 2004, since abandoned.

BACKGROUND OF THE INVENTION

1. Field of the Invention

This invention generally relates to a block noise reducing apparatus. When a video signal is encoded into a compressed digital signal fit to be transmitted or recorded, block noise tends to occur in the compressed digital signal. In addition, when the compressed digital signal is decoded into the original video signal, block noise tends to occur in the decoding-resultant video signal. This invention specifically relates to an apparatus for reducing or removing such block noise in a video signal.

2. Description of the Related Art

In a known compressively encoding procedure, every frame represented by an input video signal is divided into rectangular blocks each having a plurality of pixels neighboring in horizontal and vertical directions, and the input video signal is compressed and encoded rectangular-block by rectangular-block to get an output video signal. The output video signal is transmitted via a recording medium or a transmission line before being decoded rectangular-block by rectangular-block to recover the original video signal.

In the case where the amount of information represented by an output video signal is required to be small, the rate of the compression of an input video signal is set to a large value. A difference in tone represented by the output video signal between adjacent rectangular blocks tends to be greater as the compression rate is larger. For example, a difference in tone represented by the output video signal between adjacent rectangular blocks is noticeable when a picture represented by the input video signal has only a gradual tone variation. Such a tone difference is referred to as block noise. In some cases, the block noise is noticeable in a picture represented by the output video signal.

Japanese patent application publication number P2001-119695A discloses a block noise reducing apparatus including a filter circuit for correcting a signal level difference at the boundary between adjacent rectangular blocks to reduce or remove block noise.

Specifically, the block noise reducing apparatus in Japanese patent application P2001-119695A includes an isolated differential point extraction circuit, a filter circuit, a delay circuit, and an adder. The isolated differential point extraction circuit differentiates an input video signal to get a differentiated video signal, and then extracts every portion of the differentiated video signal which corresponds to an isolated differential point. The extracted signal portions compose an isolated differential point signal. In general, isolated differential points correspond to tone differences between adjacent rectangular blocks which mean block noise. The filter circuit subjects the isolated differential point signal to a prescribed filtering process to get a corrective signal for canceling tone differences between adjacent rectangular blocks. For every isolated differential point, the corrective signal has effective values relating only to a limited picture area composed of 4 successive pixels. The center of the limited picture area corresponds to the isolated differential point. The delay circuit defers the input video signal to get a delayed video signal. The adder combines the delayed video signal and the corrective signal, thereby correcting the delayed video signal in response to the corrective signal to reduce or remove tone differences between adjacent rectangular blocks. The adder outputs the correction-resultant video signal as a block-noise-reduced video signal or a block-noise-removed video signal.

In the block noise reducing apparatus of Japanese patent application P2001-119695A, the corrective signal has effective values relating only to a limited picture area composed of 4 successive pixels centered at an isolated differential point. Thus, video signal portions relating to pixels other than the 4 successive pixels are uncorrected. In some cases, uncorrected video signal portions cause insufficient reduction or removal of block noise.

The block noise reducing apparatus of Japanese patent application P2001-119695A tends to deteriorate high frequency components of a video signal.

In the case where an input video signal represents a picture originally or naturally having tone differences between adjacent rectangular blocks, the block noise reducing apparatus of Japanese patent application P2001-119695A causes a deteriorated picture represented by the correction-resultant video signal.

SUMMARY OF THE INVENTION

It is a first object of this invention to provide an apparatus for sufficiently reducing block noise in a video signal.

It is a second object of this invention to provide an apparatus for reducing block noise in a video signal without deteriorating high frequency components of the video signal.

It is a third object of this invention to provide a block noise reducing apparatus which suspends a process of reducing block noise to prevent the occurrence of a significant deterioration in a picture in the case where an input video signal represents a picture originally or naturally having tone differences between adjacent rectangular blocks.

A first aspect of this invention provides an apparatus for reducing block noise in an input video signal resulting from compressively encoding an original video signal rectangular-block by rectangular-block to get an encoded digital video signal, and expansively decoding the encoded digital video signal rectangular-block by rectangular-block. The apparatus comprises first means for calculating first and second differences in level represented by the input video signal at first and second inter-block boundaries adjoining opposite edges of every rectangular block respectively; second means for calculating a corrective value at every pixel in the rectangular block from a position of the pixel and the first and second differences calculated by the first means according to a predetermined equation; and third means for adding the corrective value calculated by the second means to a level represented by the input video signal to get an output video signal. The predetermined equation is designed so that levels represented by the output video signal at respective pixels in the rectangular block will be on a line given by a predetermined function of pixel position and connecting a first point in a range corresponding to the first difference calculated by the first means and a second point in a range corresponding to the second difference calculated by the first means.

A second aspect of this invention provides an apparatus for reducing block noise in an input video signal resulting from compressively encoding an original video signal rectangular-block by rectangular-block to get an encoded digital video signal, and expansively decoding the encoded digital video signal rectangular-block by rectangular-block. The apparatus comprises first means for calculating first and second differences in level represented by the input video signal at first and second inter-block boundaries adjoining opposite edges of every rectangular block respectively; second means for calculating a corrective value at every pixel in the rectangular block from a position of the pixel and the first and second differences calculated by the first means according to a predetermined equation; third means for adding the corrective value calculated by the second means to a level represented by the input video signal to get a first output video signal; fourth means for comparing the first and second differences calculated by the first means with a predetermined threshold value to decide whether or not block noise occurs at the first and second inter-block boundaries; and fifth means for selecting one of (1) the first output video signal generated by the third means and (2) the input video signal in response to results of the comparing by the fourth means to get a second output video signal. The predetermined equation is designed so that levels represented by the first output video signal at respective pixels in the rectangular block will be on a line given by a predetermined function of pixel position and connecting a first point in a range corresponding to the first difference calculated by the first means and a second point in a range corresponding to the second difference calculated by the first means.

A third aspect of this invention provides an apparatus for reducing block noise in an input video signal resulting from compressively encoding an original video signal rectangular-block by rectangular-block to get an encoded digital video signal, and expansively decoding the encoded digital video signal rectangular-block by rectangular-block. The apparatus comprises first means for calculating first and second differences in level represented by the input video signal at first and second inter-block boundaries adjoining opposite edges of every rectangular block respectively; second means for calculating a corrective value at every pixel in the rectangular block from a position of the pixel and the first and second differences calculated by the first means according to a predetermined equation; third means for adding the corrective value calculated by the second means to a level represented by the input video signal to get a first output video signal; fourth means for comparing the first and second differences calculated by the first means with a predetermined threshold value to decide whether or not block noise occurs at the first and second inter-block boundaries; a filter for filtering the input video signal to get a filtered video signal; and fifth means for selecting one of (1) the first output video signal generated by the first means and (2) the filtered video signal generated by the filter in response to results of the comparing by the fourth means to get a second output video signal. The predetermined equation is designed so that levels represented by the first output video signal at respective pixels in the rectangular block will be on a line given by a predetermined function of pixel position and connecting a first point in a range corresponding to the first difference calculated by the first means and a second point in a range corresponding to the second difference calculated by the first means.

A fourth aspect of this invention is based on the third aspect thereof, and provides an apparatus wherein the filter comprises a low pass filter.

A fifth aspect of this invention provides an apparatus for reducing block noise in an input video signal resulting from compressively encoding an original video signal rectangular-block by rectangular-block to get an encoded digital video signal, and expansively decoding the encoded digital video signal rectangular-block by rectangular-block. The apparatus comprises first means for calculating first and second differences in level represented by the input video signal at first and second inter-block boundaries adjoining opposite edges of every rectangular block respectively; second means for calculating a corrective value at every pixel in the rectangular block from a position of the pixel and the first and second differences calculated by the first means according to a predetermined equation; third means for adding the corrective value calculated by the second means to a level represented by the input video signal to get a first output video signal; fourth means for comparing the first and second differences calculated by the first means with first and second predetermined threshold values to decide conditions of block noise at the first and second inter-block boundaries; a filter for filtering the input video signal to get a filtered video signal; and fifth means for selecting one of (1) the first output video signal generated by the first means, (2) the input video signal, and (3) the filtered video signal generated by the filter in response to results of the comparing by the fourth means to get a second output video signal. The predetermined equation is designed so that levels represented by the first output video signal at respective pixels in the rectangular block will be on a line given by a predetermined function of pixel position and connecting a first point in a range corresponding to the first difference calculated by the first means and a second point in a range corresponding to the second difference calculated by the first means.

A sixth aspect of this invention is based on the fifth aspect thereof, and provides an apparatus wherein the filter comprises a low pass filter.

DETAILED DESCRIPTION OF THE INVENTION

The prior-art block noise reducing apparatus disclosed in Japanese patent application P2001-119695A will be further explained below for a better understanding of this invention.

Figure 1:
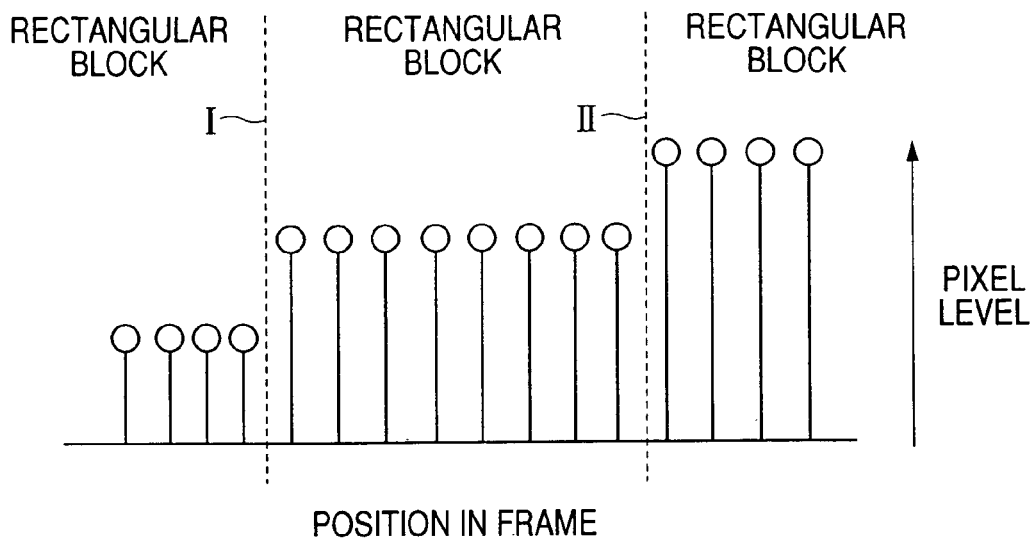
FIG. 1 is a diagram of an example of the levels at successive pixels in a linear portion of a graduation picture represented by an input video signal and having a gradual stepwise tone variation.

FIG. 1 shows an example of the levels (the luminance levels or the tone levels) at successive pixels in a linear portion of a graduation picture represented by an input video signal and having a gradual stepwise tone variation. In FIG. 1, there are stepwise tone changes (stepwise luminance changes) at the boundaries I and II between adjacent rectangular blocks.

Figure 2:
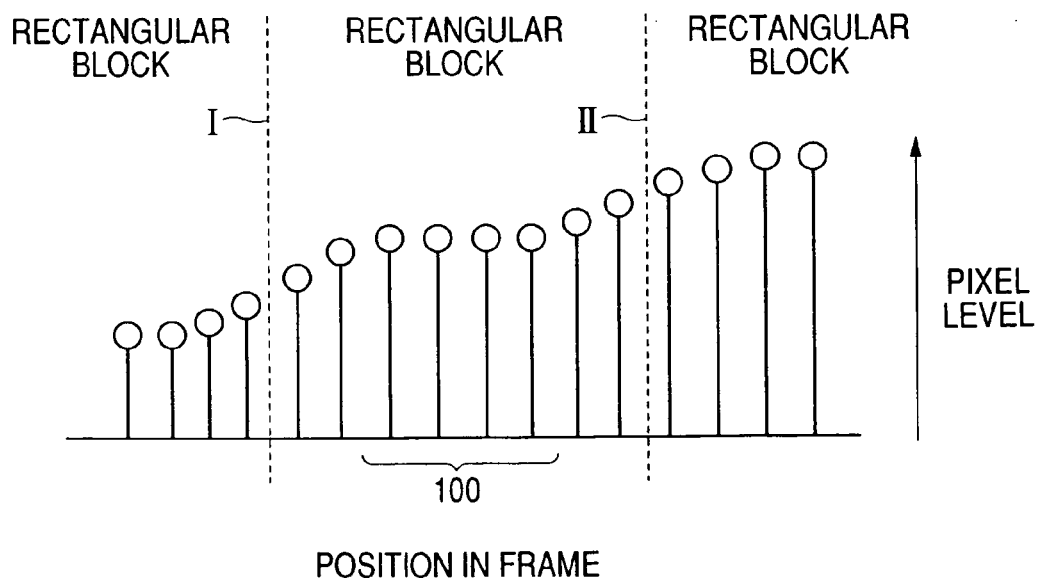
FIG. 2 is a diagram of the levels at successive pixels in a linear portion of a graduation picture represented by a correction-resultant video signal which is generated by a prior-art block noise reducing apparatus and which originates from the input video signal in FIG. 1.

The prior-art block noise reducing apparatus corrects the input video signal (see FIG. 1) to reduce or remove block noise while using the filter circuit. Thus, the prior-art noise reducing apparatus generates the correction-resultant video signal. FIG. 2 shows the levels (the luminance levels) at successive pixels in a linear portion of a graduation picture represented by the correction-resultant video signal which originates from the input video signal (see FIG. 1). In the prior-art block noise reducing apparatus, the corrective signal has effective values relating only to a limited picture area composed of 4 successive pixels centered at an isolated differential point. Therefore, as shown in FIG. 2, the levels (the luminance levels) at 4 successive pixels around the boundary I or II between adjacent rectangular blocks are corrected while the levels (the luminance levels) at other pixels are uncorrected. Specifically, the levels (the luminance levels) at successive pixels in a picture area 100 relatively remote from the inter-block boundaries I and II are uncorrected. When the successive pixels in FIG. 2 are arranged along the horizontal direction with respect to the related picture, the uncorrected picture area 100 is seen as a vertical stripe. When the successive pixels in FIG. 2 are arranged along the vertical direction with respect to the related picture, the uncorrected picture area 100 is seen as a horizontal stripe.

First Embodiment

Figure 3:
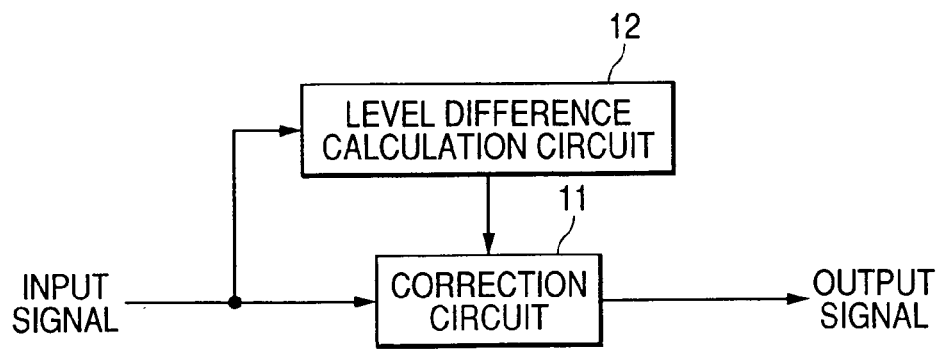
FIG. 3 is a block diagram of a block noise reducing apparatus according to a first embodiment of this invention.

FIG. 3 shows a block noise reducing apparatus according to a first embodiment of this invention. The apparatus of FIG. 3 includes a correction circuit 11 and a block-noise-related level-difference calculation circuit 12 connected with each other.

An input video signal (an input digital video signal) is fed to the correction circuit 11 and the level-difference calculation circuit 12. The input video signal is generated in a set of a conventional compressively encoding procedure and a conventional expansively decoding procedure as follows. Every frame represented by an original video signal is divided into rectangular blocks each having a plurality of pixels or a prescribed number of pixels neighboring in horizontal and vertical directions. The original video signal is compressed and encoded rectangular-block by rectangular-block to get an encoded digital video signal. The encoded digital video signal is recorded on a recording medium or sent along a transmission line. Then, the encoded digital video signal is reproduced from the recording medium or received from the transmission line. The reproduced digital video signal or the received digital video signal is decoded and expanded rectangular-block by rectangular-block to get a decoded digital video signal equivalent to the original video signal. The decoded digital video signal is used as the input video signal fed to the correction circuit 11 and the level-difference calculation circuit 12.

The correction circuit 11 and the level-difference calculation circuit 12 receive, from a previous-stage device such as a digital tuner, information about the boundaries between rectangular blocks composing every frame related to the input video signal.

The level-difference calculation circuit 12 computes block-noise-related level differences at the opposite edges of rectangular blocks or at the boundaries between rectangular blocks composing every frame related to the input video signal. The level-difference calculation circuit 12 informs the correction circuit 11 of the computed block-noise-related level differences.

The correction circuit 11 corrects the input video signal in response to the block-noise-related level differences according to a prescribed corrective equation, and thereby generates a correction-resultant video signal, that is, a block-noise-reduced video signal or a block-noise-removed video signal. The correction circuit 11 feeds the block-noise-reduced video signal or the block-noise-removed video signal to an external device (not shown) as an output video signal.

Figure 4:
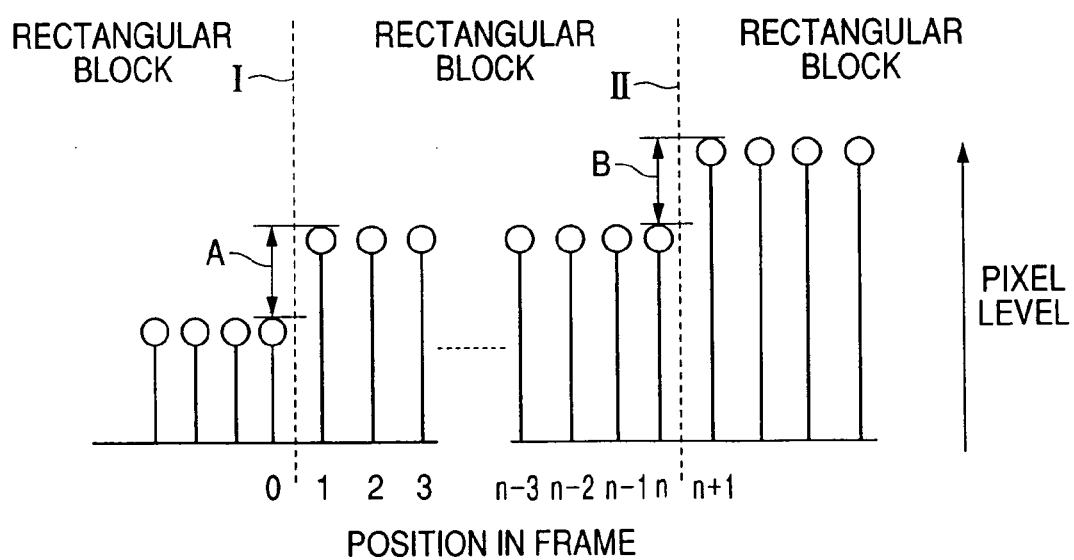
FIG. 4 is a diagram of an example of the levels at successive pixels in a linear portion of a graduation picture represented by an input video signal and having a gradual stepwise tone variation.

FIG. 4 shows an example of the levels (the luminance levels or the tone levels) at successive pixels in a linear portion of a graduation picture represented by the input video signal and having a gradual stepwise tone variation. The successive pixels in FIG. 4 are arranged along the horizontal direction or the vertical direction with respect to the related picture (the related frame).

In FIG. 4, there are stepwise tone changes (stepwise luminance changes) at the boundaries I and II between adjacent rectangular blocks respectively. The inter-block boundary I is of interest. The inter-block boundary II is next to the inter-block boundary I of interest as viewed in the scanning direction. The last pixel in the first rectangular block is given an order number of "0". The first and later pixels in the second rectangular block are given order numbers of "1", "2", . . . , and "n", respectively. The last pixel in the second rectangular block has an order number of "n". Thus, the interval between the inter-block boundary I of interest and the next inter-block boundary II corresponds to "n" pixels. The first pixel in the third rectangular block is given an order number of "n+1". The inter-block boundary I of interest extends between the last pixel "0" in the first rectangular block and the first pixel "1" in the second rectangular block. The difference "A" between the level (the luminance level or the tone level) at the pixel "0" and the level at the pixel "1" is the stepwise tone change at the inter-block boundary I of interest. The next inter-block boundary II extends between the last pixel "n" in the second rectangular block and the first pixel "n+1" in the third rectangular block. The difference "B" between the level (the luminance level or the tone level) at the pixel "n" and the level at the pixel "n+1" is the stepwise tone change at the next inter-block boundary II.

In FIG. 4, the second rectangular block, that is, the rectangular block between the inter-block boundaries I and II is of interest. The pixel of interest changes from one to another of the pixels in the rectangular block of interest as time goes by.

The level-difference calculation circuit 12 computes an intermediate value (a middle value) "a" with respect to the level difference "A" at the inter-block boundary I of interest according to the following equation.

$$a = (P0 - P1)/2 \quad (1)$$

where P0 denotes the level at the pixel "0", and P1 denotes the level at the pixel "1". In addition, the level-difference calculation circuit 12 computes an intermediate value (a middle value) "b" with respect to the level difference "B" at the next inter-block boundary II according to the following equation.

$$b = (Pn+1 - Pn)/2 \quad (2)$$

where Pn denotes the level at the pixel "n", and Pn+1 denotes the level at the pixel "n+1". The level-difference calculation circuit 12 informs the correction circuit 11 of the computed intermediate values "a" and "b".

The correction circuit 11 corrects the input video signal into the output video signal (the correction-resultant video signal) in response to the intermediate values "a" and "b" according to the following equation.

$$So = Si + a + \{(b-a) \cdot (2k+1)/2n\} \quad (3)$$

where So denotes the level represented by the output video signal (the level at the pixel of interest which is represented by the output video signal); Si denotes the level represented by the input video signal (the level at the pixel of interest which is represented by the input video signal); "k" denotes a variable indicating the position of the pixel of interest; and "n" denotes the total number of horizontally-arranged pixels or vertically-arranged pixels in the rectangular block of interest (the rectangular block between the inter-block boundaries I and II). Specifically, the variable "k" is equal to "0" when the pixel "1" is of interest. The variable "k" is equal to "1" when the pixel "2" is of interest. The variable "k" increases from "0" to "n−1" as the pixel of interest changes from the pixel "1" to the pixel "n". The variable "k" is equal to "n−1" when the pixel "n" is of interest. In the equation (3), the term "a+{(b−a)·(2k+1)/2n}" is a corrective value to be added to the level "Si" represented by the input video signal. The correction circuit 11 feeds the output video signal (the correction-resultant video signal) to an external device (not shown).

Figure 5:
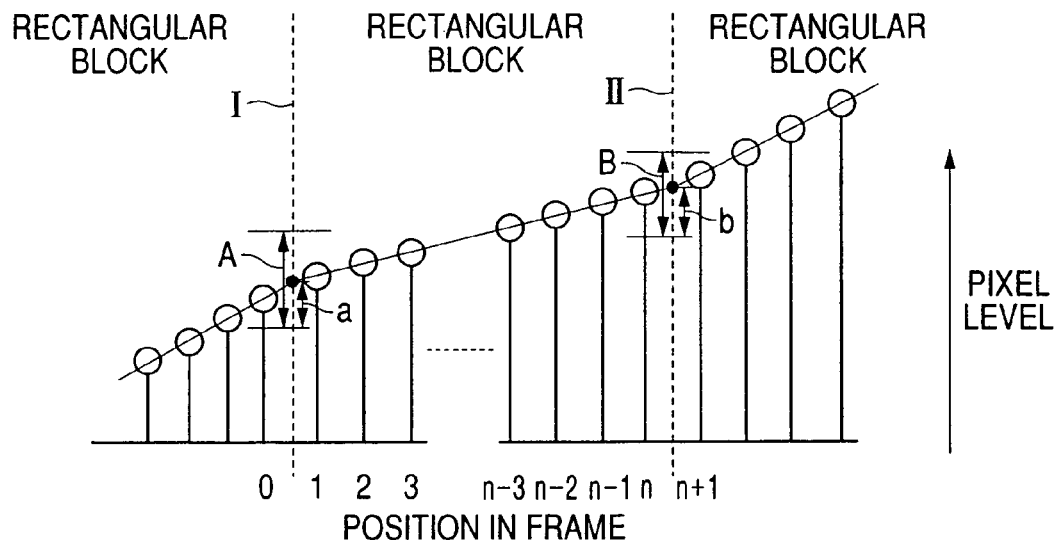
FIG. 5 is a diagram of the levels at successive pixels in a linear portion of a graduation picture represented by an output video signal which is generated by the block noise reducing apparatus in FIG. 3, and which originates from the input video signal in FIG. 4.

FIG. 5 shows the levels (the luminance levels or the tone levels) at successive pixels in a linear portion of a graduation picture represented by the output video signal which originates from the input video signal (see FIG. 4). As shown in FIG. 5, regarding the output video signal, the levels at the pixels "1", "2", ..., "n" in the rectangular block between the inter-block boundaries I and II (the rectangular block of interest) are on the straight line connecting the point on the inter-block boundary I of interest which corresponds to the intermediate value "a" and the point on the next inter-block boundary II which corresponds to the intermediate value "b". It should be noted that the straight line may be replaced by a curved line provided by a predetermined function of the pixel position.

The rectangular block of interest changes from one to another of the rectangular blocks in the related frame represented by the input video signal as time goes by. The levels at the pixels in the rectangular block of interest which relates to the input video signal are corrected by the correction circuit 11 as previously mentioned. As shown in FIGS. 4 and 5, the output video signal has sufficiently-reduced block-noise components even when the input video signal represents a graduation picture having a gradual stepwise tone variation.

The correction of the input video signal by the correction circuit 11 and the level-difference calculation circuit 12 means correction of substantially DC components of the input video signal which does not use any filter significantly deteriorating high frequency components of the input video signal. Accordingly, it is possible to reduce or remove block noise without significantly deteriorating high frequency components of the input video signal.

The correction circuit 11 and the level-difference calculation circuit 12 may be formed by a digital signal processor or a similar device having a combination of an input/output port, a processing section, a ROM, and a RAM. In this case, the correction circuit 11 and the level-difference calculation circuit 12 operate according to a control program stored in the ROM. The control program is designed to enable the correction circuit 11 and the level-difference calculation circuit 12 to execute the previously-mentioned operation steps.

Second Embodiment

Figure 6:
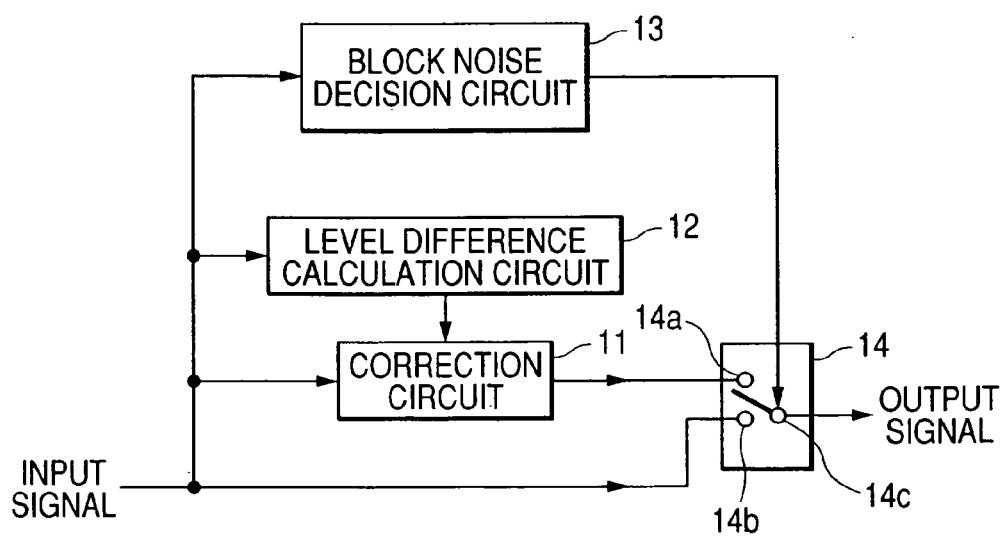
FIG. 6 is a block diagram of a block noise reducing apparatus according to a second embodiment of this invention.

FIG. 6 shows a block noise reducing apparatus according to a second embodiment of this invention. The apparatus of FIG. 6 is similar to the apparatus of FIG. 3 except for an additional design mentioned hereafter.

The apparatus of FIG. 6 includes a block noise decision circuit 13 and a switch circuit 14. The block noise decision circuit 13 and the switch circuit 14 receive the input video signal. The block noise decision circuit 13 is connected with the switch circuit 14. The switch circuit 14 is connected with the level-difference calculation circuit 12.

The switch circuit 14 includes input terminals 14a and 14b, an output terminal 14c, and a control terminal. The input terminal 14a is connected to the output side of the correction circuit 11. The input terminal 14b is subjected to the input video signal. The output terminal 14c leads to an external device (not shown). The control terminal of the switch circuit 14 is connected to the output side of the block noise decision circuit 13. In the switch circuit 14, the output terminal 14c is selectively connected with either the input terminal 14a or the input terminal 14b depending on the logic state of a signal (a control signal) applied to the control terminal.

The block noise decision circuit 13 receives, from a previous-stage device such as a digital tuner, information about the boundaries between rectangular blocks composing every frame related to the input video signal.

In operation, the input video signal is fed to the correction circuit 11, the level-difference calculation circuit 12, the block noise decision circuit 13, and the input terminal 14b of the switch circuit 14. The correction-resultant video signal is fed from the correction circuit 11 to the input terminal 14a of the switch circuit 14.

For every rectangular block related to the input video signal, the block noise decision circuit 13 calculates the level differences "A" and "B" at the opposite inter-block boundaries adjoining the rectangular block respectively. The block noise decision circuit 13 compares the calculated level differences "A" and "B" with a prescribed threshold value Th. The result of the comparison is in one of the following conditions (1), (2), (3), and (4).

$$A \leq Th, B \leq Th \quad (1)$$

$$A > Th, B \leq Th \quad (2)$$

$$A \leq Th, B > Th \quad (3)$$

$$A > Th, B > Th \quad (4)$$

In the case where at least one of the calculated level differences "A" and "B" exceeds the prescribed threshold value Th, there is a high possibility that the input video signal represents a picture originally or naturally having tone differences between adjacent rectangular blocks. In this case, as will be mentioned later, the correction of the input video signal by the correction circuit 11 and the level-difference calculation circuit 12 are made ineffective. On the other hand, in the case where both the calculated level differences "A" and "B" are smaller than the prescribed threshold value Th, it is decided that block noise occurs at the inter-block boundaries adjoining the opposite edges of the rectangular block of interest which relates to the input video signal. In this case, as will be mentioned later, the correction of the input video signal by the correction circuit 11 and the level-difference calculation circuit 12 are made effective.

The block noise decision circuit 13 determines whether or not the comparison result is in the above-indicated condition (1), that is, whether or not block noise occurs at the inter-block boundaries adjoining the opposite edges of the rectangular block of interest. The block noise decision circuit 13 generates a binary control signal in response to the result of the determination. For example, the generated control signal is in a high-level state when the comparison result is in the above-indicated condition (1), that is, when block noise occurs at the inter-block boundaries adjoining the opposite edges of the rectangular block of interest. Otherwise, the generated control signal is in a low-level state. The block noise decision circuit 13 outputs the control signal to the switch circuit 14.

The switch circuit 14 selects the correction-resultant video signal when the control signal is in its high-level state, that is, when the comparison result is in the above-indicated condition (1). In other words, the switch circuit 14 selects the correction-resultant video signal when block noise occurs at the inter-block boundaries adjoining the opposite edges of the rectangular block of interest. The switch circuit 14 selects the input video signal when the control signal is in its low-level state, that is, when the comparison result is in one of the above-indicated conditions (2), (3), and (4). In other words, the switch circuit 14 selects the input video signal when block noise does not occur at the inter-block boundaries adjoining the opposite edges of the rectangular block of interest. The switch circuit 14 passes the selected video signal to the external device as an output video signal. Therefore, the correction of the input video signal by the correction circuit 11 and the level-difference calculation circuit 12 is made effective when the control signal is in its high-level state, that is, when the comparison result is in the above-indicated condition (1). Otherwise, the correction of the input video signal by the correction circuit 11 and the level-difference calculation circuit 12 is made ineffective. In other words, the correction of the input video signal by the correction circuit 11 and the level-difference calculation circuit 12 is made effective when block noise occurs at the inter-block boundaries adjoining the opposite edges of the rectangular block of interest, and is made ineffective when block noise does not occur.

As understood from the above explanation, the input video signal which represents a picture originally or naturally having tone differences between adjacent rectangular blocks is propagated through the apparatus of FIG. 6 without being corrected by the correction circuit 11 and the level-difference calculation circuit 12. Accordingly, such an input video signal is prevented from suffering a deterioration in a related picture which might be caused by the correction by the correction circuit 11 and the level-difference calculation circuit 12.

The correction circuit 11, the level-difference calculation circuit 12, the block noise decision circuit 13, and the switch circuit 14 may be formed by a digital signal processor or a similar device having a combination of an input/output port, a processing section, a ROM, and a RAM. In this case, the correction circuit 11, the level-difference calculation circuit 12, the block noise decision circuit 13, and the switch circuit 14 operate according to a control program stored in the ROM. The control program is designed to enable the correction circuit 11, the level-difference calculation circuit 12, the block noise decision circuit 13, and the switch circuit 14 to execute the previously-mentioned operation steps.

Third Embodiment

Figure 7:
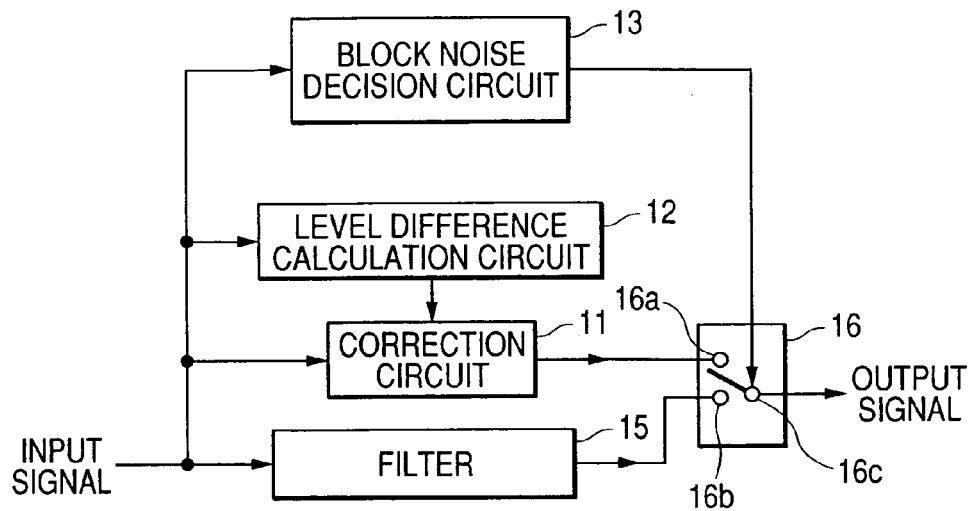
FIG. 7 is a block diagram of a block noise reducing apparatus according to a third embodiment of this invention.

FIG. 7 shows a block noise reducing apparatus according to a third embodiment of this invention. The apparatus of FIG. 7 is similar to the apparatus of FIG. 6 except for an additional design mentioned hereafter.

The apparatus of FIG. 7 includes a filter 15 and a switch circuit 16. The filter 15 receives the input video signal. The switch circuit 16 replaces the switch circuit 14 in FIG. 6.

The switch circuit 16 includes input terminals 16a and 16b, an output terminal 16c, and a control terminal. The input terminal 16a is connected to the output side of the correction circuit 11. The input terminal 16b is connected to the output side of the filter 15. The output terminal 16c leads to an external device (not shown). The control terminal of the switch circuit 16 is connected to the output side of the block noise decision circuit 13. Thus, the control terminal of the switch circuit 16 is subjected to the control signal outputted from the block noise decision circuit 13. In the switch circuit 16, the output terminal 16c is selectively connected with either the input terminal 16a or the input terminal 16b depending on the logic state of the control signal applied to the control terminal.

In operation, the input video signal is fed to the correction circuit 11, the level-difference calculation circuit 12, the block noise decision circuit 13, and the filter 15. The correction-resultant video signal is fed from the correction circuit 11 to the input terminal 16a of the switch circuit 16.

The filter 15 is of a low pass type. The device 15 suppresses high frequency components of the input video signal to get a filtering-resultant video signal. Specifically, the filter 15 reduces high frequency noise in the input video signal. The high frequency noise may contain block noise. The filter 15 outputs the filtering-resultant video signal to the input terminal 16b of the switch circuit 16.

Figure 8:
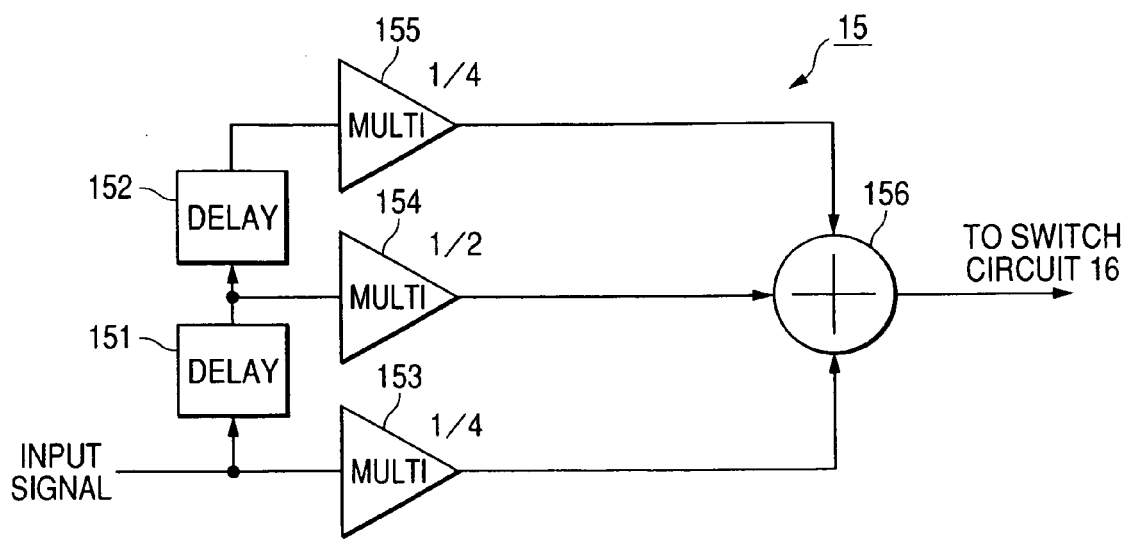
FIG. 8 is a block diagram of a filter in FIG. 7.

As shown in FIG. 8, the filter 15 includes delay circuits 151 and 152, multipliers 153, 154, and 155, and an adder 156. The input video signal is applied to the input sides of the delay circuit 151 and the multiplier 153. The output side of the delay circuit 151 is connected with the input sides of the delay circuit 152 and the multiplier 154. The output side of the delay circuit 152 is connected with the input side of the multiplier 155. The output side of the multiplier 153 is connected with a first input terminal of the adder 156. The output side of the multiplier 154 is connected with a second input terminal of the adder 156. The output side of the multiplier 155 is connected with a third input terminal of the adder 156. The output terminal of the adder 156 leads to the switch circuit 16.

The delay circuit 151 defers the input video signal by a time corresponding to one pixel to get a first delayed video signal. The delay circuit 151 outputs the first delayed video signal to the delay circuit 152 and the multiplier 154. The delay circuit 152 defers the first delayed video signal by a time corresponding to one pixel to get a second delayed video signal. The delay circuit 152 outputs the second delayed video signal to the multiplier 155. The device 153 multiplies the input video signal by a coefficient of ¼ to get a first multiplication-resultant video signal. The multiplier 153 outputs the first multiplication-resultant video signal to the adder 156. The device 154 multiplies the first delayed video signal by a coefficient of ½ to get a second multiplication-resultant video signal. The multiplier 154 outputs the second multiplication-resultant video signal to the adder 156. The device 155 multiplies the second delayed video signal by a coefficient of ¼ to get a third multiplication-resultant video signal. The multiplier 155 outputs the third multiplication-resultant video signal to the adder 156. The device 156 adds the first, second, and third multiplication-resultant video signals to get the filtering-resultant video signal. The adder 156 outputs the filtering-resultant video signal to the switch circuit 16.

The switch circuit 16 selects the correction-resultant video signal when the control signal is in its high-level state, that is, when the comparison result generated in the block noise decision circuit 13 is in the above-indicated condition (1). In other words, the switch circuit 16 selects the correction-resultant video signal when block noise occurs at the inter-block boundaries adjoining the opposite edges of the rectangular block of interest. The switch circuit 16 selects the filtering-resultant video signal when the control signal is in its low-level state, that is, when the comparison result is in one of the above-indicated conditions (2), (3), and (4). In other words, the switch circuit 16 selects the filtering-resultant video signal when block noise does not occur at the inter-block boundaries adjoining the opposite edges of the rectangular block of interest. The switch circuit 16 passes the selected video signal to the external device as an output video signal. Therefore, the correction of the input video signal by the correction circuit 11 and the level-difference calculation circuit 12 is made effective when the control signal is in its high-level state, that is, when the comparison result is in the above-indicated condition (1). Otherwise, the correction of the input video signal by the correction circuit 11 and the level-difference calculation circuit 12 is made ineffective, while the noise reduction by the filter 15 is made effective. In other words, the correction of the input video signal by the correction circuit 11 and the level-difference calculation circuit 12 is made effective when block noise occurs at the inter-block boundaries adjoining the opposite edges of the rectangular block of interest, and is made ineffective when block noise does not occur.

As understood from the above explanation, the input video signal which represents a picture originally or naturally having tone differences between adjacent rectangular blocks is propagated through the apparatus of FIG. 7 and is processed by the filter 15 without being corrected by the correction circuit 11 and the level-difference calculation circuit 12. Accordingly, such an input video signal is prevented from suffering a deterioration in a related picture which might be caused by the correction by the correction circuit 11 and the level-difference calculation circuit 12.

The correction circuit 11, the level-difference calculation circuit 12, the block noise decision circuit 13, the filter 15, and the switch circuit 16 may be formed by a digital signal processor or a similar device having a combination of an input/output port, a processing section, a ROM, and a RAM. In this case, the correction circuit 11, the level-difference calculation circuit 12, the block noise decision circuit 13, the filter 15, and the switch circuit 16 operate according to a control program stored in the ROM. The control program is designed to enable the correction circuit 11, the level-difference calculation circuit 12, the block noise decision circuit 13, the filter 15, and the switch circuit 16 to execute the previously-mentioned operation steps.

Fourth Embodiment

Figure 9:
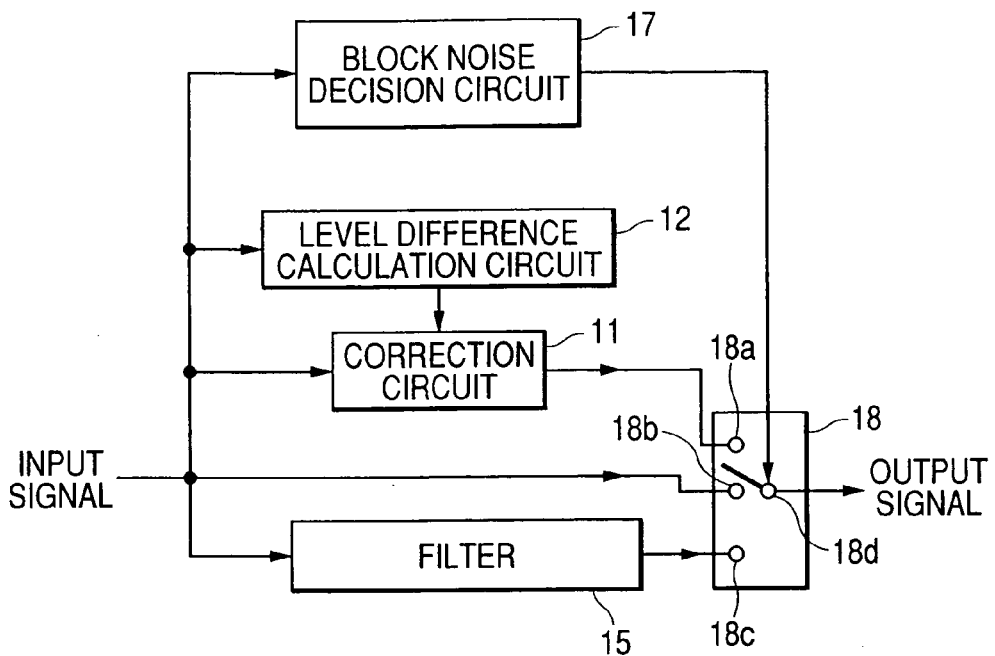
FIG. 9 is a block diagram of a block noise reducing apparatus according to a fourth embodiment of this invention.

FIG. 9 shows a block noise reducing apparatus according to a fourth embodiment of this invention. The apparatus of FIG. 9 is similar to the apparatus of FIG. 7 except for an additional design mentioned hereafter.

The apparatus of FIG. 9 includes a block noise decision circuit 17 and a switch circuit 18 which replace the block noise decision circuit 13 and the switch circuit 16 in FIG. 7 respectively. The block noise decision circuit 17 receives the input video signal. The block noise decision circuit 17 receives, from a previous-stage device such as a digital tuner, information about the boundaries between rectangular blocks composing every frame related to the input video signal.

The switch circuit 18 includes input terminals 18a, 18b, and 18C, an output terminal 18d, and a control terminal. The input terminal 18a is connected to the output side of the correction circuit 11. The input terminal 18b is subjected to the input video signal. The input terminal 18c is connected to the output side of the filter 15. The output terminal 18d leads to an external device (not shown). The control terminal of the switch circuit 18 is connected to the output side of the block noise decision circuit 17. Thus, the control terminal of the switch circuit 18 is subjected to a control signal outputted from the block noise decision circuit 17. In the switch circuit 18, the output terminal 18d is selectively connected with one of the input terminals 18a, 18b, and 18c depending on the logic state of the control signal applied to the control terminal.

In operation, the input video signal is fed to the input terminal 18b of the switch circuit 18. The correction-resultant video signal is fed from the correction circuit 11 to the input terminal 18a of the switch circuit 18. The filtering-resultant video signal is fed from the filter 15 to the input terminal 18c of the switch circuit 18. The switch circuit 18 selects one among the input video signal, the correction-resultant video signal, and the filtering-resultant video signal in response to the control signal outputted from the block noise decision circuit 17. The switch circuit 18 passes the selected video signal to the external device as an output video signal.

For every rectangular block related to the input video signal, the block noise decision circuit 17 calculates the level differences "A" and "B" at the opposite inter-block boundaries adjoining the rectangular block. The block noise decision circuit 17 compares the calculated level differences "A" and "B" with first and second prescribed threshold values Th1 and Th2. The first prescribed threshold value Th1 is greater than the second prescribed threshold value Th2. The block noise decision circuit 17 generates the control signal in response to the results of the comparison. The generated control signal is of a multiple-bit type. The generated control signal can change among at least three different logic states. The block noise decision circuit 17 outputs the generated control signal to the switch circuit 18.

The block noise decision circuit 17 determines whether or not both the level differences "A" and "B" are smaller than the second prescribed threshold value Th2. When both the level differences "A" and "B" are smaller than the second prescribed threshold value Th2, the block noise decision circuit 17 concludes that block noise occurs at the inter-block boundaries adjoining the opposite edges of the rectangular block of interest. In this case, the block noise decision circuit 17 sets the control signal to a first logic state.

The block noise decision circuit 17 determines whether or not both the level differences "A" and "B" exceed the first prescribed threshold value Th1. When both the level differences "A" and "B" exceed the first prescribed threshold value Th1, the block noise decision circuit 17 concludes that the input video signal represents a picture originally or naturally having tone differences between adjacent rectangular blocks. In this case, the block noise decision circuit 17 sets the control signal to a second logic state.

The block noise decision circuit 17 determines whether or not at least one of the level differences "A" and "B" exists between the first and second prescribed threshold values Th1 and Th2. When at least one of the level differences "A" and "B" exists between the first and second prescribed threshold values Th1 and Th2, the block noise decision circuit 17 concludes as follows. It is unclear that block noise occurs at the inter-block boundaries adjoining the opposite edges of the rectangular block of interest, and that the input video signal represents a picture originally or naturally having tone differences between adjacent rectangular blocks. In this case, the block noise decision circuit 17 sets the control signal to a third logic state.

The block noise decision circuit 17 determines whether or not one of the level differences "A" and "B" is smaller than the second prescribed threshold value Th2 and the other exceeds the first prescribed threshold value Th1. When one of the level differences "A" and "B" is smaller than the second prescribed threshold value Th2 and the other exceeds the first prescribed threshold value Th1, the block noise decision circuit 17 concludes as follows. It is unclear that block noise occurs at the inter-block boundaries adjoining the opposite edges of the rectangular block of interest, and that the input video signal represents a picture originally or naturally having tone differences between adjacent rectangular blocks. In this case, the block noise decision circuit 17 sets the control signal to the third logic state.

The switch circuit 18 selects the correction-resultant video signal when the control signal applied to the switch circuit 18 is in its first logic state, that is, when both the level differences "A" and "B" are smaller than the second prescribed threshold value Th2. In other words, the switch circuit 18 selects the correction-resultant video signal when block noise occurs at the inter-block boundaries adjoining the opposite edges of the rectangular block of interest.

The switch circuit 18 selects the filtering-resultant video signal when the control signal applied to the switch circuit 18 is in its second logic state, that is, when both the level differences "A" and "B" exceed the first prescribed threshold value Th1. In other words, the switch circuit 18 selects the filtering-resultant video signal when the input video signal represents a picture originally or naturally having tone differences between adjacent rectangular blocks.

The switch circuit 18 selects the input video signal when the control signal applied to the switch circuit 18 is in its third logic state, that is, when at least one of the level differences "A" and "B" exists between the first and second prescribed threshold values Th1 and Th2 or when one of the level differences "A" and "B" is smaller than the second prescribed threshold value Th2 and the other exceeds the first prescribed threshold value Th1. In other words, the switch circuit 18 selects the input video signal when it is unclear that block noise occurs at the inter-block boundaries adjoining the opposite edges of the rectangular block of interest, and that the input video signal represents a picture originally or naturally having tone differences between adjacent rectangular blocks.

As understood from the above explanation, the input video signal which represents a picture originally or naturally having tone differences between adjacent rectangular blocks is propagated through the apparatus of FIG. 9 without being corrected by the correction circuit 11 and the level-difference calculation circuit 12. Accordingly, such an input video signal is prevented from suffering a deterioration in a related picture which might be caused by the correction by the correction circuit 11 and the level-difference calculation circuit 12. The filtering-resultant video signal is used as an output video signal when it is unclear that block noise occurs at the inter-block boundaries adjoining the opposite edges of the rectangular block of interest, and that the input video signal represents a picture originally or naturally having tone differences between adjacent rectangular blocks.

The correction circuit 11, the level-difference calculation circuit 12, the filter 15, the block noise decision circuit 17, and the switch circuit 18 may be formed by a digital signal processor or a similar device having a combination of an input/output port, a processing section, a ROM, and a RAM. In this case, the correction circuit 11, the level-difference calculation circuit 12, the filter 15, the block noise decision circuit 17, and the switch circuit 18 operate according to a control program stored in the ROM. The control program is designed to enable the correction circuit 11, the level-difference calculation circuit 12, the filter 15, the block noise decision circuit 17, and the switch circuit 18 to execute the previously-mentioned operation steps.

Fifth Embodiment

Figure 10:
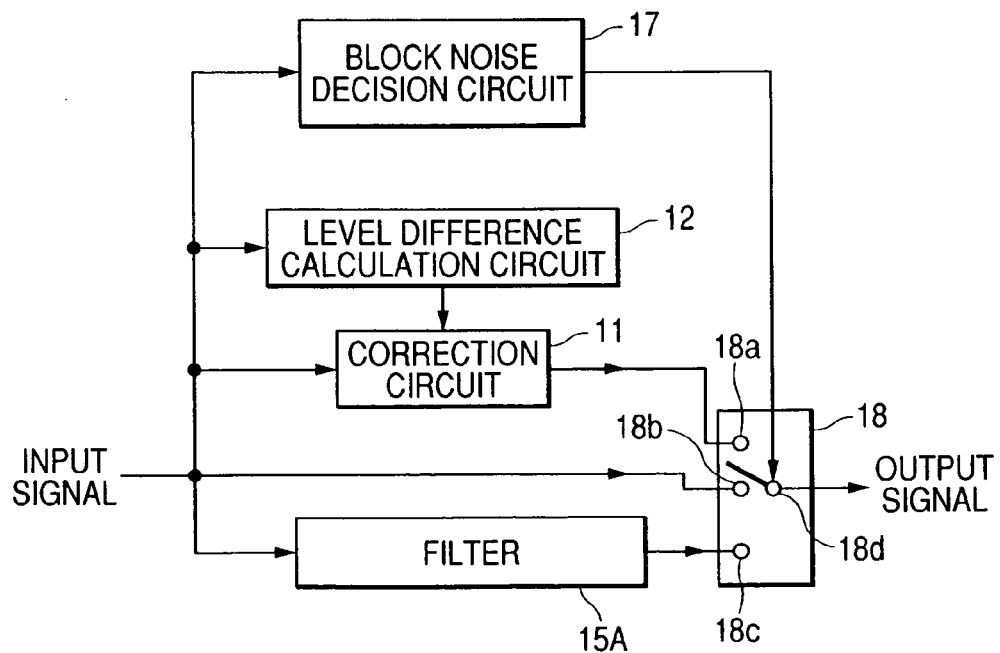
FIG. 10 is a block diagram of a block noise reducing apparatus according to a fifth embodiment of this invention.

FIG. 10 shows a block noise reducing apparatus according to a fifth embodiment of this invention. The apparatus of FIG. 10 is similar to the apparatus of FIG. 9 except that a filter 15A replaces the filter 15. The filter 15A in the apparatus of FIG. 10 has a frequency response characteristic different from that of the filter 15.

Sixth Embodiment

A sixth embodiment of this invention is similar to one of the second and third embodiments thereof (FIGS. 6 and 7) except that the threshold value Th used in the block noise decision circuit 13 can be changed.

Seventh Embodiment

A seventh embodiment of this invention is similar to the fourth embodiment thereof (FIG. 9) except that the threshold values Th1 and Th2 used in the block noise decision circuit 17 can be changed.

Eighth Embodiment

An eighth embodiment of this invention is similar to one of the first to seventh embodiments thereof except for a design change mentioned hereafter.

According to the eighth embodiment of this invention, a first point is decided in a range corresponding to the level difference "A" at the inter-block boundary I of interest (see FIGS. 4 and 5) while a second point is decided in a range corresponding to the level difference "B" at the next inter-block boundary II. Then, the first point and the second point are connected by a straight line or a curved line provided by a predetermined function of the pixel position. The correction of the input video signal by the correction circuit 11 and the level-difference calculation circuit 12 is designed so that regarding the output video signal, the levels at the pixels "1", "2", . . . , "n" in the rectangular block between the inter-block boundaries I and II (the rectangular block of interest) are on the straight line or the curved line connecting the first point and the second point.

What is claimed is:

1. An apparatus for reducing block noise in an input video signal resulting from compressively encoding an original video signal rectangular-block by rectangular-block to get an encoded digital video signal, and expansively decoding the encoded digital video signal rectangular-block by rectangular-block, comprising:

first means for calculating first and second differences in level represented by the input video signal at first and second inter-block boundaries adjoining opposite edges of every rectangular block respectively;

second means for calculating a corrective value at every pixel in the rectangular block from a position of the pixel and the first and second differences calculated by the first means according to a predetermined equation;

third means for adding the corrective value calculated by the second means to a level represented by the input video signal to get a first output video signal;

fourth means for comparing the first and second differences calculated by the first means with a predetermined threshold value to decide whether or not block noise occurs at the first and second inter-block boundaries;

a filter for filtering the input video signal to get a filtered video signal; and fifth means for selecting one of (1) the first output video signal generated by the third means and (2) the filtered video signal generated by the filter in response to results of the comparing by the fourth means to get a second output video signal;

wherein the predetermined equation is designed so that levels represented by the first output video signal at respective pixels in the rectangular block will be on a line given by a predetermined function of pixel position and connecting a first point in a range corresponding to the first difference calculated by the first means and a second point in a range corresponding to the second difference calculated by the first means; and wherein the filter comprises a low pass filter.

2. An apparatus for reducing block noise in an input video signal resulting from compressively encoding an original video signal rectangular-block by rectangular-block to get an encoded digital video signal, and expansively decoding the encoded digital video signal rectangular-block by rectangular-block, comprising:

first means for calculating first and second differences in level represented by the input video signal at first and second inter-block boundaries adjoining opposite edges of every rectangular block respectively;

second means for calculating a corrective value at every pixel in the rectangular block from a position of the pixel and the first and second differences calculated by the first means according to a predetermined equation;

third means for adding the corrective value calculated by the second means to a level represented by the input video signal to get a first output video signal;

fourth means for comparing the first and second differences calculated by the first means with first and second predetermined threshold values to decide conditions of block noise at the first and second inter-block boundaries;

a filter for filtering the input video signal to get a filtered video signal; and fifth means for selecting one of (1) the first output video signal generated by the third means, (2) the input video signal, and (3) the filtered video signal generated by the filter in response to results of the comparing by the fourth means to get a second output video signal;

wherein the predetermined equation is designed so that levels represented by the first output video signal at respective pixels in the rectangular block will be on a line given by a predetermined function of pixel position and connecting a first point in a range corresponding to the first difference calculated by the first means and a second point in a range corresponding to the second difference calculated by the first means; and wherein the filter comprises a low pass filter.

* * * * *